US008078065B2

(12) United States Patent
Koc

(10) Patent No.: US 8,078,065 B2
(45) Date of Patent: Dec. 13, 2011

(54) POLARIZATION TRACKING AND SIGNAL EQUALIZATION FOR OPTICAL RECEIVERS CONFIGURED FOR ON-OFF KEYING OR PULSE AMPLITUDE MODULATION SIGNALING

(75) Inventor: Ut-Va Koc, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 989 days.

(21) Appl. No.: 11/959,960

(22) Filed: Dec. 19, 2007

(65) Prior Publication Data

US 2008/0152363 A1 Jun. 26, 2008

Related U.S. Application Data

(60) Provisional application No. 60/876,617, filed on Dec. 22, 2006.

(51) Int. Cl.
*H04B 10/06* (2006.01)

(52) U.S. Cl. ........ 398/208; 398/152; 398/202; 398/205; 398/209; 398/210; 398/211

(58) Field of Classification Search ............... 398/65, 398/152, 202, 205, 208–211
See application file for complete search history.

(56) References Cited

U.S. PATENT DOCUMENTS

| | | | | |
|---|---|---|---|---|
| 6,714,742 | B1 * | 3/2004 | Hayee et al. | 398/65 |
| 2002/0008506 | A1 * | 1/2002 | Nakada et al. | 324/120 |
| 2002/0042802 | A1 * | 4/2002 | Mogi et al. | 708/319 |
| 2002/0186435 | A1 * | 12/2002 | Shpantzer et al. | 359/136 |
| 2004/0146099 | A1 * | 7/2004 | Denny et al. | 375/229 |
| 2004/0264598 | A1 * | 12/2004 | Demir et al. | 375/297 |
| 2005/0196176 | A1 * | 9/2005 | Sun et al. | 398/152 |
| 2007/0092259 | A1 * | 4/2007 | Bontu et al. | 398/147 |
| 2008/0152362 | A1 * | 6/2008 | Koc | 398/205 |
| 2009/0034981 | A1 * | 2/2009 | Kato | 398/136 |

OTHER PUBLICATIONS

Quadrature amplitude modulation (QAM). (2001). In Hargraves's Communications Dictionary, Wiley. Retrieved from http://www.credoreference.com/entry/hargravecomms/quadrature_amplitude_modulation_qam.*

"System and Method for Receiving Coherent, Polarization-Multiplexed Optical Signals," by Noriaki Kaneda, et al., U.S. Appl. No. 11/426,191, filed Jun. 23, 2006.

J.H. Winters, "Equalization in Coherent Lightwave Systems Using Microwave Waveguides," J. Lightwave Technology, vol. 7, No. 5, May 1989, pp. 813-815.

* cited by examiner

*Primary Examiner* — Nathan Curs
*Assistant Examiner* — Tanya Ngo
(74) *Attorney, Agent, or Firm* — Mendelsohn, Drucker & Associates, P.C.; Yuri Gruzdkov; Steve Mendelsohn

(57) ABSTRACT

According to one embodiment, an optical receiver adapted to recover OOK or PAM data carried by a modulated optical carrier has an optical detector adapted to produce a sequence of vector pairs having first and second digital vectors indicative of complex values of first and second polarization components, respectively, of the modulated optical carrier at a corresponding sampling time. The optical receiver also has a digital processor that is connected to receive the sequence and is adapted to perform a rotation on each pair in a manner that tends to compensate for polarization rotation produced by transmitting the modulated optical carrier from an optical transmitter thereof to the optical receiver. The digital processor is further adapted to estimate values of the OOK or PAM data encoded onto each of the first and second polarization components based on the vectors produced by the rotation in a manner responsive to values of energy errors in the estimated values.

6 Claims, 6 Drawing Sheets

100

200

460

570

POLARIZATION TRACKING AND SIGNAL EQUALIZATION FOR OPTICAL RECEIVERS CONFIGURED FOR ON-OFF KEYING OR PULSE AMPLITUDE MODULATION SIGNALING

CROSS-REFERENCE TO RELATED APPLICATIONS

This application claims priority from U.S. Provisional Patent Application No. 60/876,617 filed Dec. 22, 2006, which is incorporated herein by reference in its entirety.

BACKGROUND OF THE INVENTION

1. Field of the Invention

The present invention relates to optical communication equipment and, more specifically, to signal processing in optical receivers of on-off keying (OOK) and/or pulse amplitude modulation (PAM) signals.

2. Description of the Related Art

This section introduces aspects that may help facilitate a better understanding of the inventions. Accordingly, the statements of this section are to be read in this light and are not to be understood as admissions about what is in the prior art or what is not in the prior art.

A polarization-diverse intradyne receiver operates on an optical signal having two independently modulated polarization components. The receiver may employ sophisticated signal processing to recover the two corresponding data streams. However, there are two major challenges that hinder the advancement of this technique. First, it is very difficult to synchronize a local laser (also often referred to as a reference optical carrier or local oscillator) with the received modulated optical carrier in terms of phase and frequency because the optical frequencies are relatively large (typically, on the order of 200 THz). Second, it is very difficult to align the polarization of the local laser with that of the received optical signal because the polarization of the latter is affected by the optical transmission link and tends to change over time.

SUMMARY OF THE INVENTION

According to one embodiment, an optical receiver adapted to recover on-off keying (OOK) or pulse amplitude modulation (PAM) data carried by a modulated optical carrier comprises an optical detector adapted to produce a sequence of vector pairs having first and second digital vectors indicative of complex values of first and second polarization components, respectively, of the modulated optical carrier at a corresponding sampling time. The optical receiver further comprises a digital processor that is connected to receive the sequence and is adapted to perform a rotation on each pair in a manner that tends to compensate for polarization rotation produced by transmitting the modulated optical carrier from an optical transmitter thereof to the optical receiver. The digital processor is further adapted to estimate values of the OOK or PAM data encoded onto each of the first and second polarization components based on the vectors produced by the rotation in a manner responsive to values of energy errors in the estimated values.

According to one embodiment, an apparatus of the invention comprises an optical receiver adapted to recover OOK or PAM data carried by a modulated optical carrier. The optical receiver comprises an optical detector adapted to produce a sequence of first digital vectors, each first digital vector being indicative of a complex value of a first polarization component of the modulated optical carrier at a corresponding sampling time. The optical receiver further comprises a digital processor being connected to receive the sequence of said first digital vectors and being adapted to estimate values of said OOK or PAM data based on the received sequence of said first digital vectors in a manner responsive to values of energy errors in said estimated values.

According to another embodiment, an apparatus of the invention comprises an optical receiver adapted to recover data carried by a modulated optical carrier. The optical receiver comprises an optical detector adapted to produce a sequence of vector pairs having first and second digital vectors, each first digital vector being indicative of a complex value of a first polarization component of the modulated optical carrier at a corresponding sampling time, and each second digital vector being indicative of a complex value of a different second polarization component of the modulated optical carrier at the sampling time. The optical receiver further comprises a digital processor being connected to receive the sequence of said vector pairs and being adapted to perform a rotation on a pair from said sequence in a manner that tends to compensate for polarization rotation produced during transmission of the modulated optical carrier from an optical transmitter thereof to the optical receiver, the digital processor being configured to recover said data from vectors resulting from the performed rotation.

According to yet another embodiment, a method of recovering OOK or PAM data carried by a modulated optical carrier comprises the step of producing a sequence of first digital vectors, each first digital vector being indicative of a complex value of a first polarization component of the modulated optical carrier at a corresponding sampling time. The method further comprises the step of estimating values of said OOK or PAM data based on the sequence of said first digital vectors in a manner responsive to values of energy errors in said estimated values.

According to yet another embodiment, a method of recovering data carried by a modulated optical carrier comprises the step of producing a sequence of vector pairs having first and second digital vectors, each first digital vector being indicative of a complex value of a first polarization component of the modulated optical carrier at a corresponding sampling time, and each second digital vector being indicative of a complex value of a different second polarization component of the modulated optical carrier at the sampling time. The method further comprises the step of performing a rotation on a vector pair from said sequence in a manner that tends to compensate for polarization rotation produced during transmission of the modulated optical carrier from an optical transmitter thereof to an optical receiver, which is adapted to recover said data from vectors resulting from the performed rotation.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
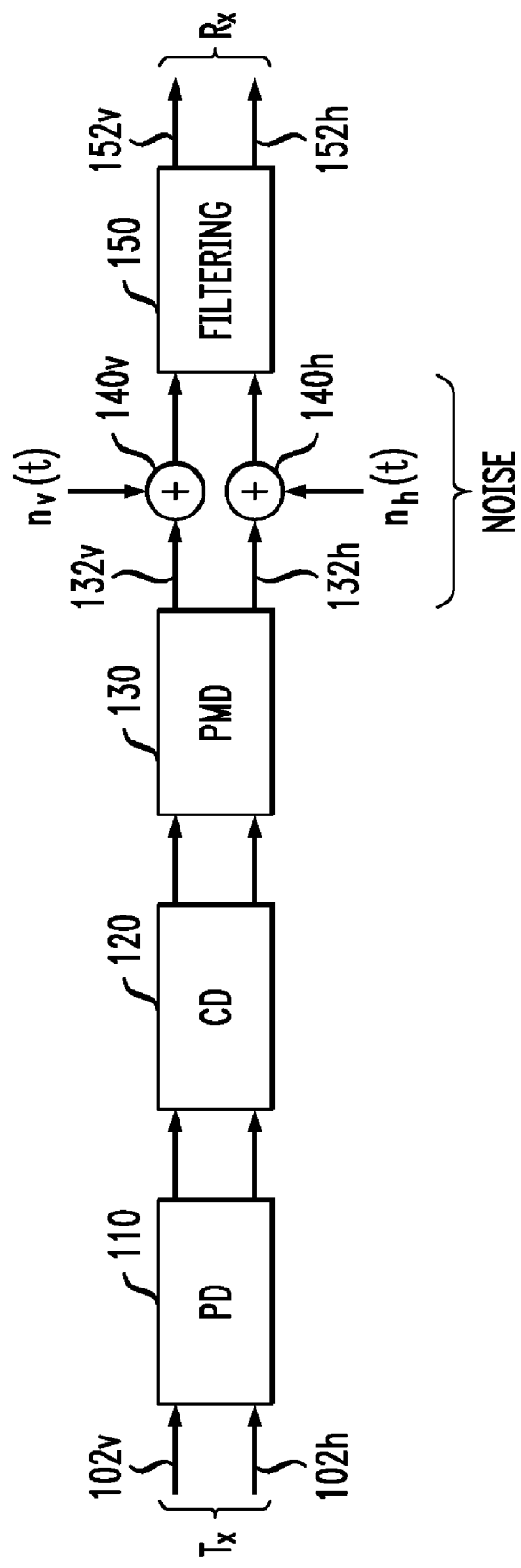
FIG. 1 shows a representative optical transmission link.

FIG. 1 shows a representative optical transmission link 100 that couples an optical transmitter (Tx) and an optical receiver (Rx). The transmitter applies to link 100 an optical signal (modulated optical carrier) 102 having two independently modulated polarization components, illustratively a vertically polarized component 102v and a horizontally polarized component 102h. The transmitter generates both components of signal 102 using either on-off keying (OOK) or pulse amplitude modulation (PAM) signaling. While transmitting optical signal 102 to the receiver, link 100 imposes onto it various impairments, some of which are discussed in more detail below. These impairments transform optical signal 102 into an optical signal 152 having a vertically polarized component 152v and a horizontally polarized component 152h. Optical signal 152 is applied to the receiver, where appropriate signal processing is performed to recover the information encoded onto signal 102 at the transmitter.

One impairment that might be imposed onto optical signal 102 in link 100 is polarization distortion (PD), which is represented in FIG. 1 by block 110. More specifically, link 100 typically has an optical fiber. Different sections of the fiber typically have different principal states of polarization (PSPs) that are not necessarily aligned with the polarization components of signal 102. This misalignment causes each of the polarization components to generally have a non-zero projection on each of the PSPs, which mixes the polarization components and alters the polarization state of the signal. In addition, the PSPs tend to change over time, e.g., due to varying physical conditions in link 100. This temporal variation causes the relationship between signal components 102v-h and 152v-h to vary over time as well.

Another impairment that might be imposed onto optical signal 102 in link 100 is chromatic dispersion (CD), which is represented in FIG. 1 by block 120. It is known that different spectral components of an optical pulse travel in an optical fiber at slightly different speeds because the index of refraction of the fiber core is a function of frequency (wavelength). As a result, the optical pulse broadens as it propagates along the fiber. Two parameters commonly used to characterize chromatic dispersion are the first-order group velocity dispersion (GVD), which is measured in ps/km/nm, and the second-order GVD, which is measured in ps/km/nm$^2$. In the optical domain, both the first- and second-order GVD are linear effects. However, in the electrical domain, i.e., upon optical-to-electrical (O/E) conversion usually performed at the receiver, the GVD becomes a nonlinear effect because a typical photo-detector measures the square of the electric field, and not the electric field itself.

Chromatic dispersion is usually static and can be effectively compensated, as known in the art, by utilizing a special dispersion-compensation module. However, such a module might be relatively expensive. Furthermore, the dispersion-compensation module might add unwanted latency to the link's performance, which usually unfavorably affects the quality of service (QoS). It is also possible that the dispersion-compensation module does not fully cancel the chromatic dispersion accrued in optical link 100, and signal 152 still has in it some residual amount of chromatic dispersion.

Yet another impairment that might be imposed onto optical signal 102 in link 100 is polarization-mode dispersion (PMD), which is represented in FIG. 1 by block 130. PMD is caused by different propagation speeds of two orthogonal polarization modes due to fiber birefringence. Fiber birefringence is typically caused by deviations in the shape of the fiber core from a perfect cylinder and can be induced, e.g., by stress, bending, and/or temperature gradients. The PMD phenomenon is dynamic in nature and the PMD amount tends to change over time.

PMD is usually characterized by differential group delay (DGD), a parameter measured in ps/km$^{0.5}$ and related to PMD-induced optical pulse broadening. PMD is frequency-dependent. First-order PMD is a frequency-independent component of (this frequency-dependent) PMD and is responsible for linear inter-symbol interference (ISI) in the electrical domain (e.g., at the output of the photo-detector). Second-order (as well as higher-order) PMD is a frequency-dependent component of PMD and is responsible for optical-pulse broadening similar to that produced by the corresponding order of chromatic dispersion.

Yet another impairment that might be imposed onto optical signal 102 in link 100 is optical noise, which is represented in FIG. 1 by adders 140v-h. Link 100 usually employs one or more optical amplifiers. While boosting the signal intensity, an optical amplifier might also add incoherent amplified spontaneous-emission (ASE) noise (often referred to as optical noise). In the classical limit, i.e., when the signal and noise involve a relatively large number of photons, the optical noise can be modeled as complex additive white Gaussian noise (AWGN) in the optical field. The optical noise is added to each of the two orthogonally polarized components of the amplified signal. Adder 140v indicates the addition of AWGN $n_v(t)$ to a vertically polarized component 132v of an intermediate optical signal 132. Similarly, adder 140h indicates the addition of AWGN $n_h(t)$ to a horizontally polarized component 132h of signal 132.

Yet another impairment that might be imposed onto optical signal 102 in link 100 is spectral distortion, which is represented in FIG. 1 by filtering block 150. For example, link 100 might contain add/drop multiplexers, optical routers, and/or wavelength-division multiplexing (WDM) filters. Each of these elements is characterized by a corresponding transmission spectrum that affects the spectral content of an optical signal passing therethrough.

One skilled in the art will appreciate that the above-described impairments might accrue in link 100 through either localized or distributed mechanisms, or through a combination of both types of mechanisms. The order, in which the impairment blocks are shown in FIG. 1, is for illustration only. Neither is it intended to imply that different impairments are added in any particular order, nor that they accrue in separate physical sections of link 100.

Figure 2:
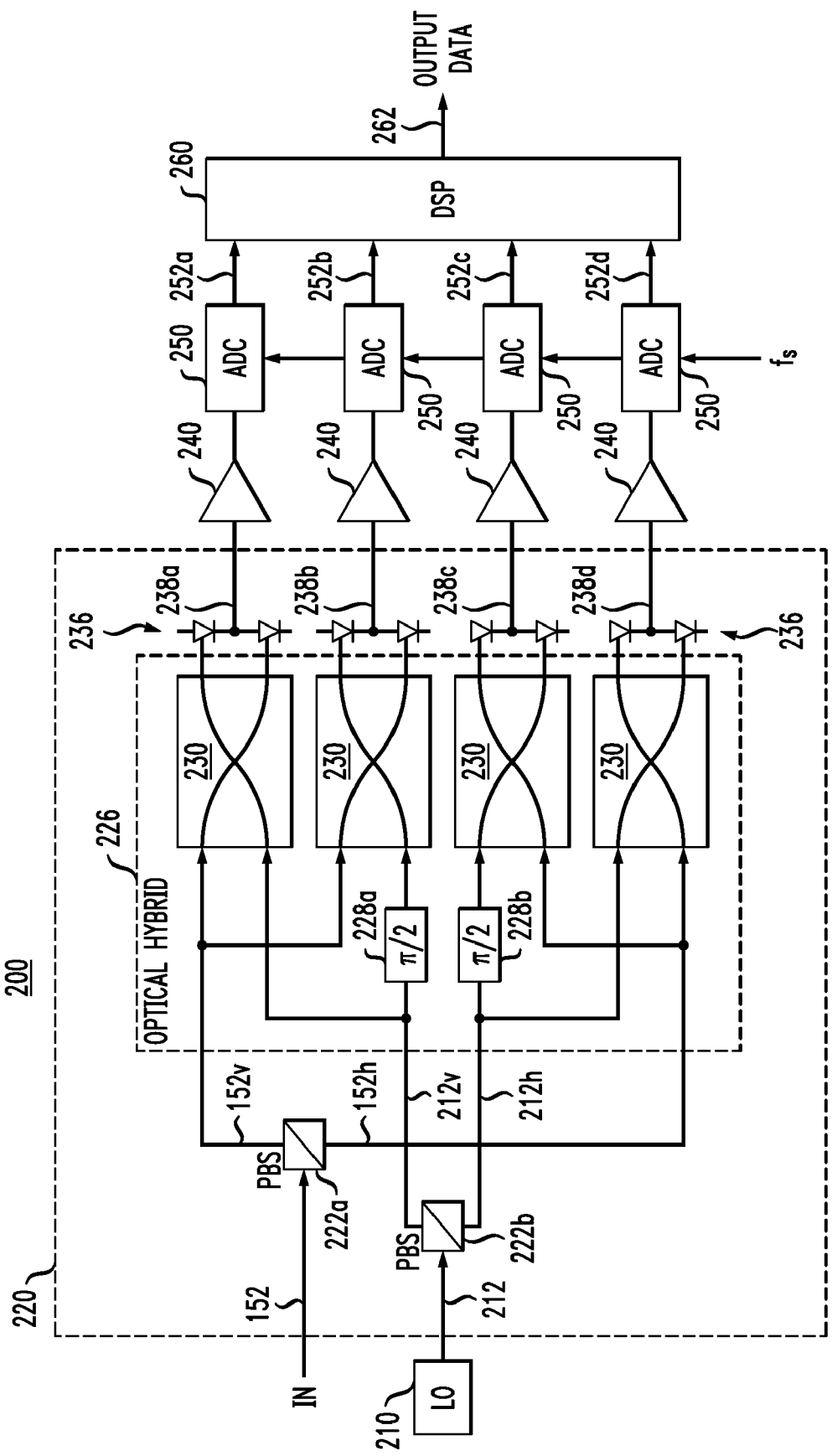
FIG. 2 shows a block diagram of an optical receiver that can be coupled to the optical transmission link of FIG. 1 according to one embodiment of the invention.

FIG. 2 shows a block diagram of an optical receiver 200 that can be coupled to optical transmission link 100 (FIG. 1) according to one embodiment of the invention. Receiver 200 has an O/E converter 220 adapted to convert optical signal 152 received from link 100 into electrical signals 238a-d. Receiver 200 further has a plurality of amplifiers 240, each receiving a corresponding one of electrical signals 238a-d and being coupled to a corresponding analog-to-digital converter (ADC) 250. Each ADC 250 samples the output of the corresponding amplifier 240 at sampling frequency $f_s$ to produce a corresponding one of digital signals 252a-d. In a preferred configuration, frequency $f_s$ is the same as the signaling rate in signal 152 or an integer multiple of that rate. Digital signals 252a-d are applied to a digital signal processor (DSP) 260 that processes them to recover the two data streams originally encoded onto optical signal 102 at the transmitter (see FIG. 1). The recovered data streams are then output from DSP 260 via an output signal 262.

O/E converter 220 implements polarization-sensitive intradyne detection using a reference signal 212 generated by a local oscillator 210. Polarization beam splitters (PBSs) 222a-b decompose signals 152 and 212, respectively, into two respective orthogonally polarized components, illustratively vertically polarized components 152v and 212v and horizontally polarized components 152h and 212h. These polarization components are then directed to an optical hybrid 226. In one embodiment, O/E converter 220 is an integrated planar waveguide circuit.

In optical hybrid 226, each of polarization components 152v, 212v, 152h, and 212h is split into two (attenuated) copies, e.g., using a conventional 3-dB power splitter. A relative phase shift of 90 degrees ($\pi/2$ radian) is then applied to one copy of component 212v and one copy of component 212h using phase shifters 228a-b, respectively. The various copies are optically mixed as shown in FIG. 2 using four optical signal mixers 230, and the outputs of the mixers (the optical mixtures) are detected by eight photo-detectors (e.g., photodiodes) 236. Photo-detectors 236 are arranged in pairs, as shown in FIG. 2, and the output of each photo-detector pair is a corresponding one of electrical signals 238a-d. One skilled in the art will appreciate that electrical signal 238a is a measure of the real part of vertically polarized component 152v in the complex plane defined by LO signal 212. Similarly, electrical signal 238b is a measure of the imaginary part of vertically polarized component 152v in that complex plane; electrical signal 238c is a measure of the real part of horizontally polarized component 152h in that complex plane; and electrical signal 238d is a measure of the imaginary part of horizontally polarized component 152h in that complex plane.

Due to a frequency mismatch between the optical carriers of signals 152 and 212 and, also, due to the finite spectral width of the LO signal and the generally present misalignment between the orientation of PBSs 222a-b and the orientation of principal polarization components of signal 152, digital signals 252a-d are convoluted signals having contributions corresponding to both of the original optical signals 102v-h (see FIG. 1). The signal processing of DSP 260 substantially de-convolutes digital signals 252a-d to recover the two data streams originally encoded onto signals 102v-h. One skilled in the art will appreciate that the signal impairments described above in reference to FIG. 1 introduce signal distortions that make the data recovery relatively difficult. However, the signal processing methods implemented in DSP 260 are robust with respect to those signal distortions and advantageously provide a lower bit-error rate (BER) than comparable prior-art methods. For example, optical receiver 200 is capable of operating without employing conventional frequency and/or phase estimation for LO 210 because OOK and PAM signaling relies on photon energy (rather than phase) to carry bit information.

Figure 3:
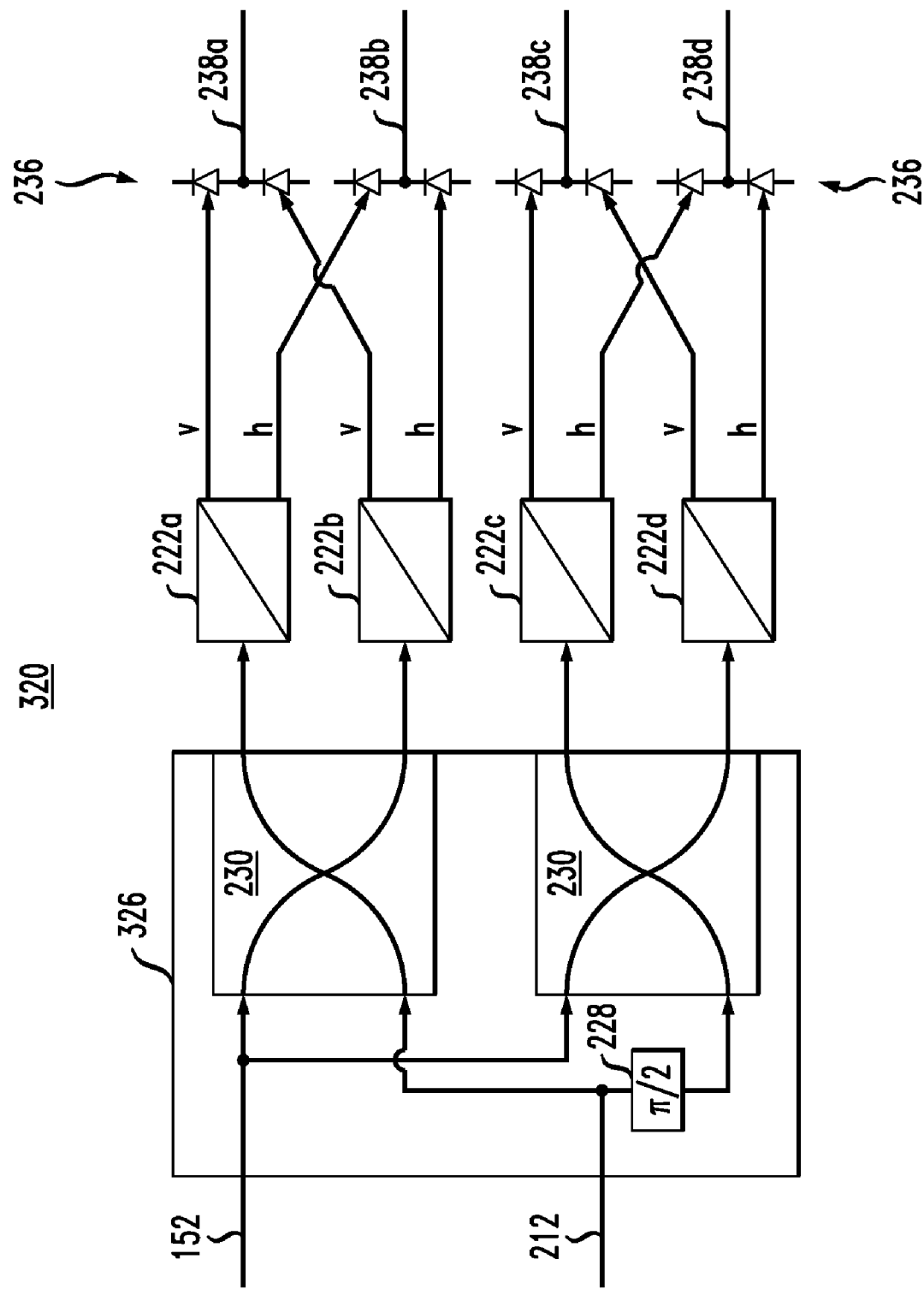
FIG. 3 shows a block diagram of an optical-to-electrical (O/E) converter that can be used in the optical receiver of FIG. 2 according to one embodiment of the invention.

FIG. 3 shows a block diagram of an O/E converter 320 that can be instead of O/E converter 220 of optical receiver 200 according to another embodiment of the invention. O/E converter 320 is generally analogous to O/E converter 220 and may be constructed using the same basic elements. However, O/E converter 320 is designed to perform optical signal mixing before polarization splitting, whereas O/E converter 220 performs polarization splitting before optical signal mixing. As a result, an optical hybrid 326 used in O/E converter 320 employs one phase shifter 228, compared to two such phase shifters employed in optical hybrid 226. Optical hybrid 326 also employs two optical signal mixers 230, compared to four such mixers employed in optical hybrid 226. On the other hand, O/E converter 320 employs four PBSs 222, compared to two such PBSs employed in O/E converter 220.

Exemplary optical hybrids that may be suitable for use in O/E converters 220 and 320 are described, e.g., in U.S. patent application Ser. No. 11/426,191, entitled "System and Method for Receiving Coherent, Polarization-Multiplexed Optical Signals," which was filed by Noriaki Kaneda and Andreas Leven on Jun. 23, 2006, and is incorporated herein by reference in its entirety. Each of optical hybrids 226 and 326 may be a bulk optical hybrid or a planar-waveguide optical hybrid. Suitable bulk optical hybrids are commercially available from Optoplex Corporation, of 3374-3390 Gateway Boulevard, Fremont, Calif. 94538.

Figure 4:
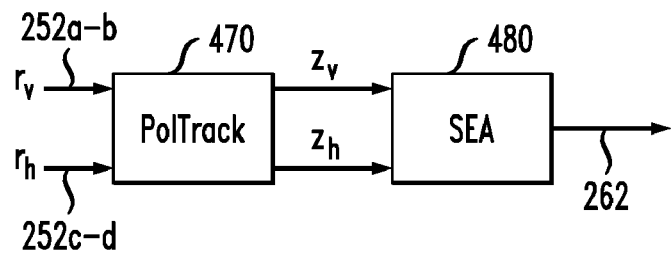
FIG. 4 shows a block diagram of a digital signal processor (DSP) that can be used in the optical receiver of FIG. 2 according to one embodiment of the invention.

FIG. 4 shows a block diagram of a DSP 460 that can be used as DSP 260 according to one embodiment of the invention. DSP 460 has two serially connected processing blocks 470 and 480. Processing block 470 is a polarization tracking (PolTrack) block designed to perform, in the electrical domain, adaptive polarization correction that substantially cancels the effect of polarization distortion in optical transmission link 100 (see block 110 in FIG. 1). Processing block 480 implements a signal equalization algorithm (SEA) that enables DSP 460 to recover the data carried by signal 152.

Processing block 470 operates on complex numbers. Input signal $r_v$ received by processing block 470 carries a stream of complex numbers, each composed of a real part and an imaginary part supplied by digital signals 252a-b, respectively. Similarly, input signal $r_h$ carries a stream of complex numbers, each composed of a real part and an imaginary part supplied by digital signals 252c-d, respectively. Each of output signals $z_v$ and $z_h$ generated by processing block 470 similarly carries complex numbers. In the event that the orientation of principal polarization components of signal 152 of FIG. 3 is aligned with the orientation of the polarization states of PBSs 222, the processing of processing block 470 can be bypassed and input signals $r_v$ and $r_h$ can be applied directly to processing block 480. The orientations of the polarization states of PBSs 222 and of principal polarization components of signal 152 can be aligned, for example, if the polarization distortion in optical transmission link 100 is relatively small or if an appropriately configured optical polarization rotator processes signal 152 before it is applied to receiver 200.

Figure 5:
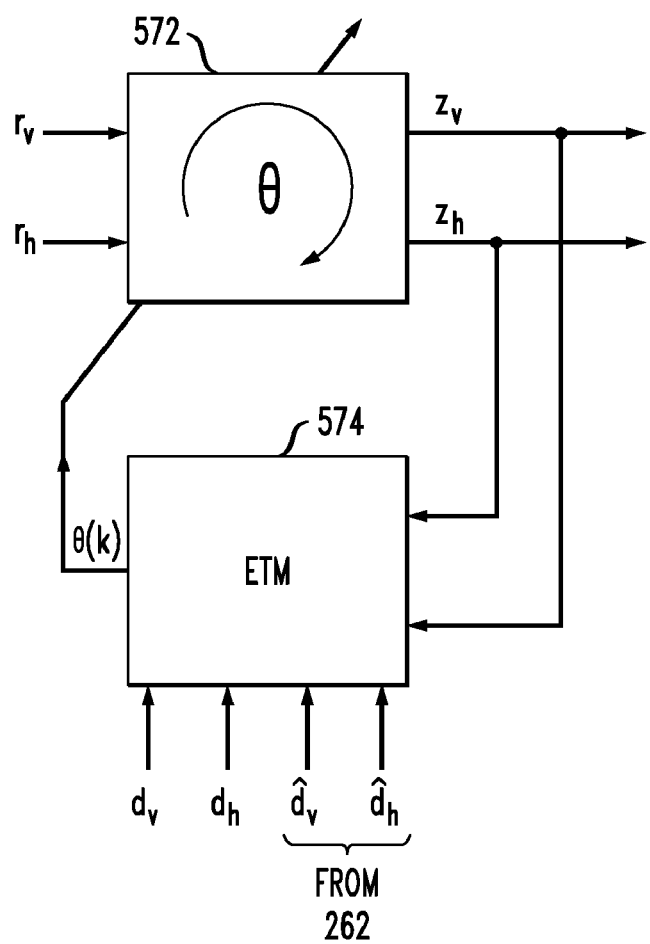
FIG. 5 shows a block diagram of a polarization-tracking block that can be used in the DSP of FIG. 4 according to one embodiment of the invention.

FIG. 5 shows a block diagram of a processing block 570 that can be used as processing block 470 of FIG. 4 according to one embodiment of the invention. In the absence of polarization-dependent loss (PDL) and polarization-dependent phase variation in optical transmission link 100, the polarization distortion (see block 110 in FIG. 1) in the link consists substantially of polarization rotation and can be described using a Jones matrix. Processing block 570 has a vector rotator 572 that rotates signals $r_v$ and $r_h$ (which are vectors in the complex plane) by angle $\theta$, the value of which is chosen so as to substantially cancel the polarization rotation imposed in link 100. Eq. (1) shows the corresponding Jones matrix used in vector rotator 572 and how it is applied to signals $r_v$ and $r_h$ to obtain signals $z_v$ and $z_h$:

$$\begin{bmatrix} \cos\theta(k) & -\sin\theta(k) \\ \sin\theta(k) & \cos\theta(k) \end{bmatrix} \begin{bmatrix} r_v(k) \\ r_h(k) \end{bmatrix} = \begin{bmatrix} z_v(k) \\ z_h(k) \end{bmatrix} \quad (1)$$

where k is a running index that denotes signaling intervals or time slots.

Processing block 570 further has an error-tracking module (ETM) 574 configured to provide the $\theta(k)$ values to vector rotator 572. For each signaling interval, ETM 574 calculates signal errors (e(k)) for both vertical and horizontal polarizations using Eqs. (2a)-(2b):

$$e_v(k) = a_v(k) - |z_v(k)|^2 \quad (2a)$$

$$e_h(k) = a_h(k) - |z_h(k)|^2 \quad (2b)$$

where a(k) is defined as follows: (i) in a training mode, when the encoded data sequence $d_{v,h}(k)$ is known, $a_{v,h}(k) = d_{v,h}(k)$ and (ii) in a normal operating mode, when the encoded data sequence is not known, $a_{v,h}(k) = \hat{d}_{v,h}(k)$, where $\hat{d}_{v,h}(k)$ represents decoded data obtained from signal 262 (see FIG. 2 or FIG. 4). For M-level PAM signaling, $d_{v,h}(k)$ or $\hat{d}_{v,h}(k) \in \{0, 1, \ldots, M-1\}$ For OOK signaling, M=2.

In one configuration, processing block 570 calculates $\theta(k)$ to minimize the combined error term $|e(k)|^2 = |e_v(k)|^2 + |e_h(k)|^2$ using the following recursive formula:

$$\theta(k+1) = \theta(k) + \frac{\gamma}{2}\partial\{|e(k)|^2\}/\partial\theta \quad (3)$$

where $\gamma$ is a positive scaling factor smaller than 1. The value of $\gamma$ affects the convergence rate and the stability of adaptive polarization tracking, and is typically chosen to be smaller than 0.1, for example, between about 0.03 and about 0.01. Using Eq. (2) and the fact that $\partial\{e_h\}/\partial\theta = -\partial\{e_v\}/\partial\theta$, Eq. (3) can be expressed as follows:

$$\theta(k+1) = \theta(k) + \gamma[|z_v|^2 - |z_H|^2]\partial\{e_h\}/\partial\theta \quad (4)$$

Eq. (4) implies that, in this configuration, processing block 570 attempts to rotate signals $r_v$ and $r_h$ to equalize energy levels for signals $z_v$ and $z_h$ (because $|z|^2$ is a measure of energy). In the case of conventional OOK encoding, with the same bits on both polarizations, this configuration is effective even in the presence of large chromatic dispersion because both polarizations are equally distorted in the optical transmission link. However, caution needs to be exercised while using this configuration with polarization-multiplexed OOK.

Figure 6:
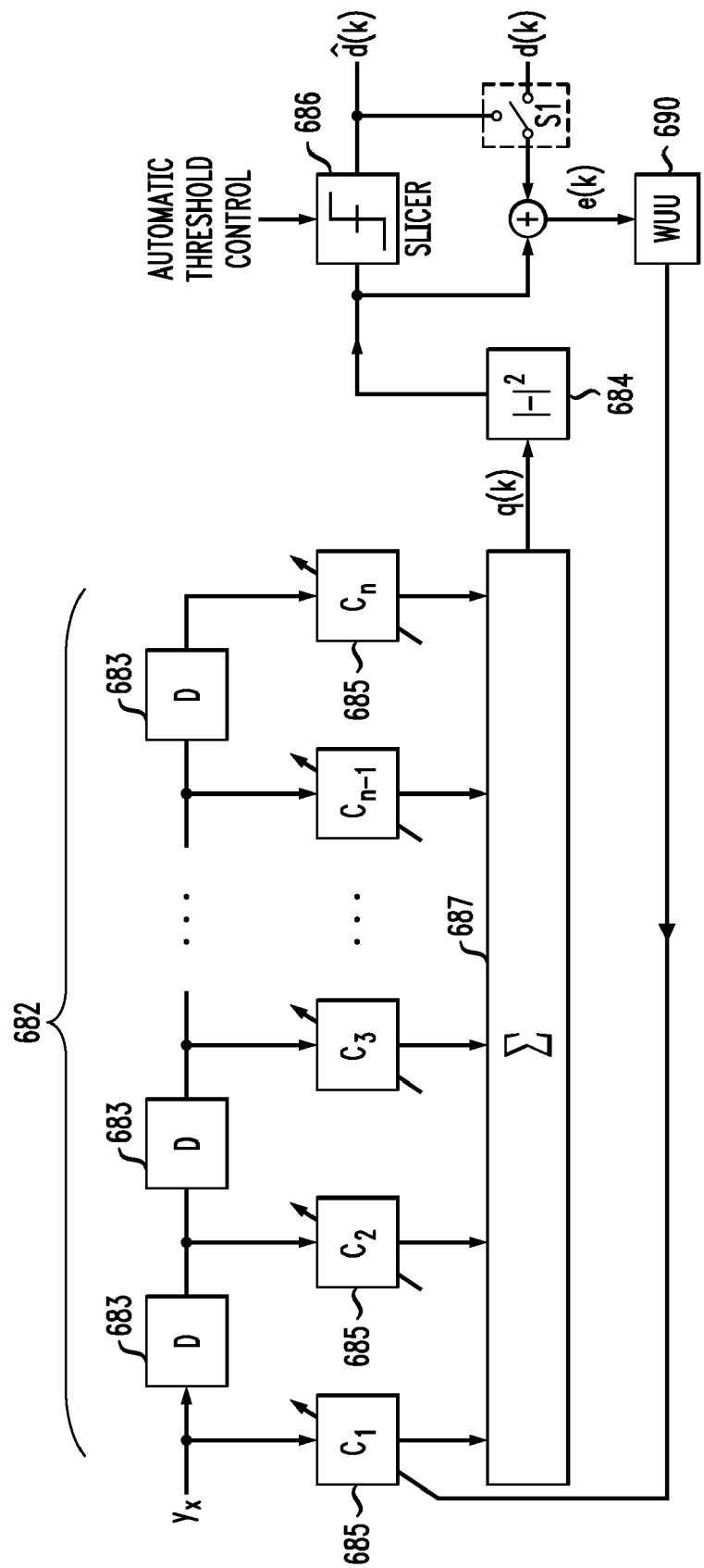
FIG. 6 shows a block diagram of a signal-equalization block that can be used in the DSP of FIG. 4 according to one embodiment of the invention.

FIG. 6 shows a block diagram of a processing block 680 that can be used in processing block 480 of FIG. 4 according to one embodiment of the invention. More specifically, processing block 480 would typically have two instances of processing block 680, one for each polarization. In FIG. 6, the signal applied to processing block 680 is designated with a generic subscript x (=v or h) to make the drawing descriptive of both polarizations. If processing block 680 is used in processing block 480 coupled to polarization-tracking block 470, then $y_x = z_x$ (see FIG. 4). However, if polarization-tracking block 470 is bypassed or not present, then $y_x = r_x$. In the description that follows, the polarization subscript is omitted altogether for the sake of simplicity.

Processing block 680 has a finite impulse response (FIR) filter 682 composed of (A) n−1 serially connected D-type flip flops (delay elements) 683, where n is a positive integer greater than 1; (B) n weighting blocks 685, $c_j$; and (C) a summation block 687, Σ. In a representative embodiment, n=39. If one redefines the values of index j in $c_j$ to run from −L to +L, then output q(k) of FIR filter 682 can be expressed as follows:

$$q(k) = \sum_{i=-L}^{L} c_i^*(k) y(k-i) \quad (5)$$

where k denotes the signaling interval and $c_i$ are the weighting coefficients used in the corresponding weighting blocks. The output of FIR filter 682 is applied to a squaring module 684 that determines the energy of that output by calculating $|q(k)|^2 = q(k)q^*(k)$. It can be shown that, because the output of squaring module 684 represents the energy of the modulated optical carrier, it is substantially free of detrimental phase terms, such as the frequency offset, linewidth, and phase noise. In contrast, prior-art equalization algorithms, such as the least mean squares (LMS) algorithm, do not have a module analogous to squaring module 684 and rely on the values representing the amplitude of the modulated optical carrier, and not its energy, to determine the data values and to generate a feedback error signal for setting the weighting coefficients. More details on the prior-art LMS algorithm can be found, e.g., in J. H. Winters, "Equalization in Coherent Lightwave Systems Using Microwave Waveguides," J. Lightwave Technology, vol. 7, No. 5, pp. 813-815, May 1989, the teachings of which are incorporated herein by reference.

The output of squaring module 684 is applied to a slicer 686 configured to compare each received value with one threshold value (in the case of OOK) or with two or more threshold values (in the case of PAM) to generate the output value ($\hat{d}(k)$) for the corresponding signaling interval. The threshold value(s) used in slicer 686 can be calculated, e.g., by statistically analyzing the output of squaring module 684 over a relatively large number (e.g., >100) of signaling intervals. Typically, the values generated by squaring module 684 will form two or more clusters. Each threshold value can be set, for example, at the mid-point between the centers of mass of the two adjacent clusters or at some other value chosen to result in an acceptably small probability of slicing error. Processing block 680 can be configured to use a sliding-window statistical analysis, according to which a predetermined number of the most recent values are statistically analyzed to adaptively determine and/or update the slicing threshold(s) for slicer 686.

Weighting coefficients $c_j$ used in the weighting blocks of FIR filter 682 are set by a weight updating unit (WUU) 690. WUU 690 calculates the weighting coefficients by attempting to minimize the cost function, J(k), defined as follows:

$$J(k) = [e(k)]^2 \quad (6)$$

where e(k) is given by Eq. (2). In one configuration, WUU 690 implements the minimization by calculating the weighting coefficients using the following recursive formula:

$$\vec{c}(k+1) = \vec{c}(k) - \beta e(k) q^*(k) \vec{y}(k) \quad (7)$$

where $\beta$ is a positive scaling factor smaller than 1; $\vec{c}(k) = [c_{-L}(k), \ldots, c_i(k), \ldots, c_L(k)]^T$, where superscript T means transposed; and $\vec{y}(k) = [y(k+L), \ldots, y(k), \ldots, y(k-L)]^T$. The value of $\beta$ affects the convergence rate and the stability of the equalization algorithm, and is typically chosen to be smaller than 0.1, for example, between about 0.03 and about 0.01.

In a training mode, switch S1 in processing block 680 is configured to feed WUU 690 with e(k) values calculated based on the (known) training data, d(k). The training mode can be used, e.g., to set the initial values of weighting coefficients in FIR filter 682. In a regular operating mode, switch S1 is configured to feed WUU 690 with e(k) values calculated based on the decoded data, d̂(k).

Figure 7A:
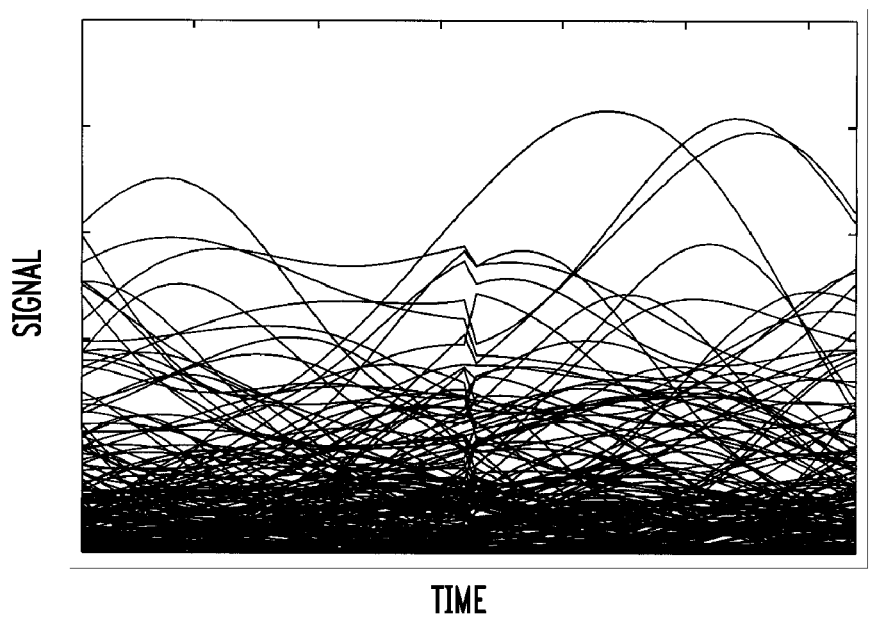
FIGS. 7A-B graphically compare the performance of the receiver shown in FIG. 2 when it is configured to use (i) a prior-art algorithm and (ii) a signal-equalization algorithm according to one embodiment of the invention.
Figure 7B:
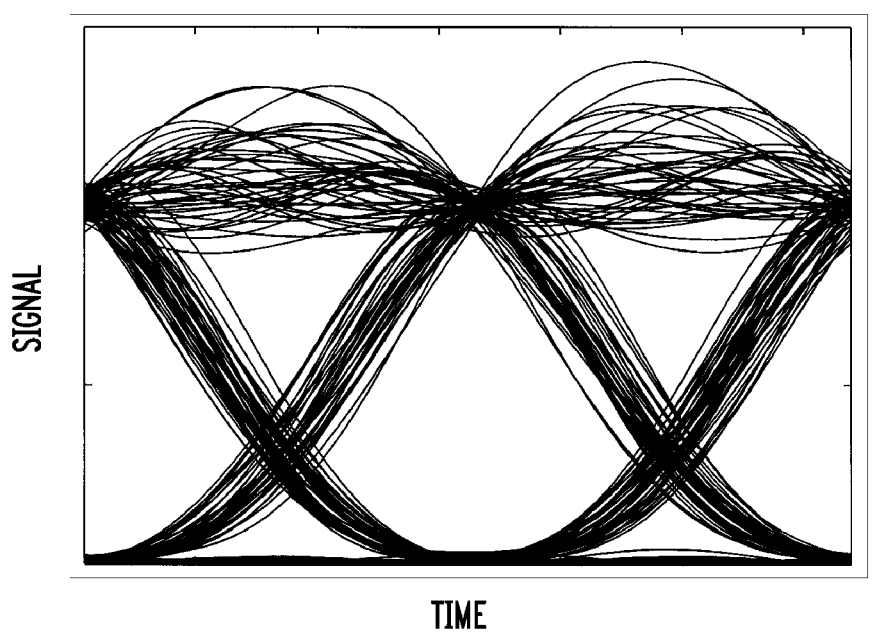

FIGS. 7A-B graphically compare the performance of receiver 200 when DSP 260 is configured to use (i) the prior-art LMS algorithm and (ii) the above-described SEA algorithm. More specifically, the transmitter was configured to apply to link 100 a non-return-to-zero (NRZ) OOK signal having a bit rate of 10 Gb/s. Link 100 had a group velocity dispersion value of about 16 ns/nm. The linewidth of the optical carrier and of the LO signal was about 10 MHz. The frequencies of the optical carriers in the data signal and the LO signal differed by about 1 GHz. Receiver 200 was configured to have 39 taps (i.e, n=39) and to run at a sampling speed of about 20 gigasamples per second. FIG. 7A shows an eye diagram corresponding to the prior-art LMS algorithm, and FIG. 7B shows an eye diagram corresponding to the SEA algorithm. As can be seen, the prior-art LMS algorithm substantially fails, whereas the SEA algorithm advantageously produces an eye diagram having a relatively widely open "eye" indicative of a relatively low BER value.

While this invention has been described with reference to illustrative embodiments, this description is not intended to be construed in a limiting sense. Although embodiments of the invention have been described in reference to OOK or PAM signals, certain aspects of the invention, e.g., digital polarization tracking can similarly be used with other modulation formats. Various modifications of the described embodiments, as well as other embodiments of the invention, which are apparent to persons skilled in the art to which the invention pertains are deemed to lie within the principle and scope of the invention as expressed in the following claims.

Embodiments of the invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An apparatus, comprising an optical receiver adapted to recover data carried by a modulated optical carrier, wherein the optical receiver comprises:

an optical detector adapted to produce a sequence of vector pairs having first and second digital vectors, each first digital vector being indicative of a complex value of a first polarization component of the modulated optical carrier at a corresponding sampling time, and each second digital vector being indicative of a complex value of a different second polarization component of the modulated optical carrier at the sampling time; and a digital processor being connected to receive the sequence of said vector pairs and being adapted to perform a rotation on a pair from said sequence in a manner that tends to compensate for polarization rotation produced during transmission of the modulated optical carrier from an optical transmitter thereof to the optical receiver, the digital processor being configured to recover said data from vectors resulting from the performed rotation, wherein the digital processor is adapted to recursively update an angle of the rotation by an amount proportional to a value of energy difference between vectors of a vector pair produced by a previous rotation of a previous vector pair having the corresponding first and second vectors.

2. The invention of claim 1, wherein:

said modulated optical carrier employs on-off keying (OOK) or pulse amplitude modulation (PAM) signaling; and the first and second polarization components are encoded with different streams of data.

3. The invention of claim 1, wherein the digital processor is adapted to perform the rotation in a manner that tends to equalize the energy of the vectors in a vector pair resulting from said rotation.

4. The invention of claim 1, wherein the optical detector comprises an optical hybrid adapted to output, for each of the first and second polarization components, (i) a first pair of optical mixtures based on first copies of the modulated optical carrier and a reference optical carrier and (ii) a second pair of optical mixtures based on a second copies of the modulated optical carrier and the reference optical carrier, wherein the first copies have a different relative phase from that of the second copies, wherein said first pair and said second pair are processed to generate the sequence of the first digital vectors.

5. A method of recovering data carried by a modulated optical carrier, the method comprising:

producing a sequence of vector pairs having first and second digital vectors, each first digital vector being indicative of a complex value of a first polarization component of the modulated optical carrier at a corresponding sampling time, and each second digital vector being indicative of a complex value of a different second polarization component of the modulated optical carrier at the sampling time;

performing a rotation on a vector pair from said sequence in a manner that tends to compensate for polarization rotation produced during transmission of the modulated optical carrier from an optical transmitter thereof to an optical receiver, which is adapted to recover said data from vectors resulting from the performed rotation; and recursively updating an angle of the rotation by an amount proportional to a value of energy difference between vectors of a vector pair produced by a previous rotation of a previous vector pair having the corresponding first and second vectors.

6. An apparatus, comprising an optical receiver adapted to recover on-off keying (OOK) or pulse amplitude modulation (PAM) data carried by a modulated optical carrier, wherein the optical receiver comprises:

an optical detector adapted to produce a sequence of first digital vectors, each first digital vector being indicative of a complex value of a first polarization component of the modulated optical carrier at a corresponding sampling time; and a digital processor being connected to receive the sequence of said first digital vectors and being adapted to estimate values of said OOK or PAM data based on the received sequence of said first digital vectors in a manner responsive to values of energy errors in said estimated values, wherein the digital processor comprises:

a digital filter adapted to equalize a selected portion of the received sequence using a plurality of weighting coefficients, each applied to a corresponding one of the first digital vectors from said portion;

a squaring module coupled to the output of the digital filter and adapted to determine the energy corresponding to the equalized portion; and a weight updating unit adapted to adaptively determine said weighting coefficients based on a value of energy error for the equalized portion and to supply said determined weighting coefficients for use in the digital filter, wherein the digital filter comprises:

(n−1) serially connected delay elements, with the sequence of said first digital vectors being applied to a first delay element of the series and propagating in a pipeline manner through the series, where n is an integer greater than 1 that defines the length of the selected portion; and n weighting blocks, a first of which is coupled to an input of the first delay element and each of the remaining (n−1) of which is coupled to an output of the corresponding one of the (n−1) delay elements, wherein each of said weighting blocks is adapted to apply to the corresponding first digital vector a corresponding weighting coefficient received from the weight updating unit.

* * * * *